Oct. 16, 1951 W. C. SCHILLING 2,571,952
CONTOUR CUTTER

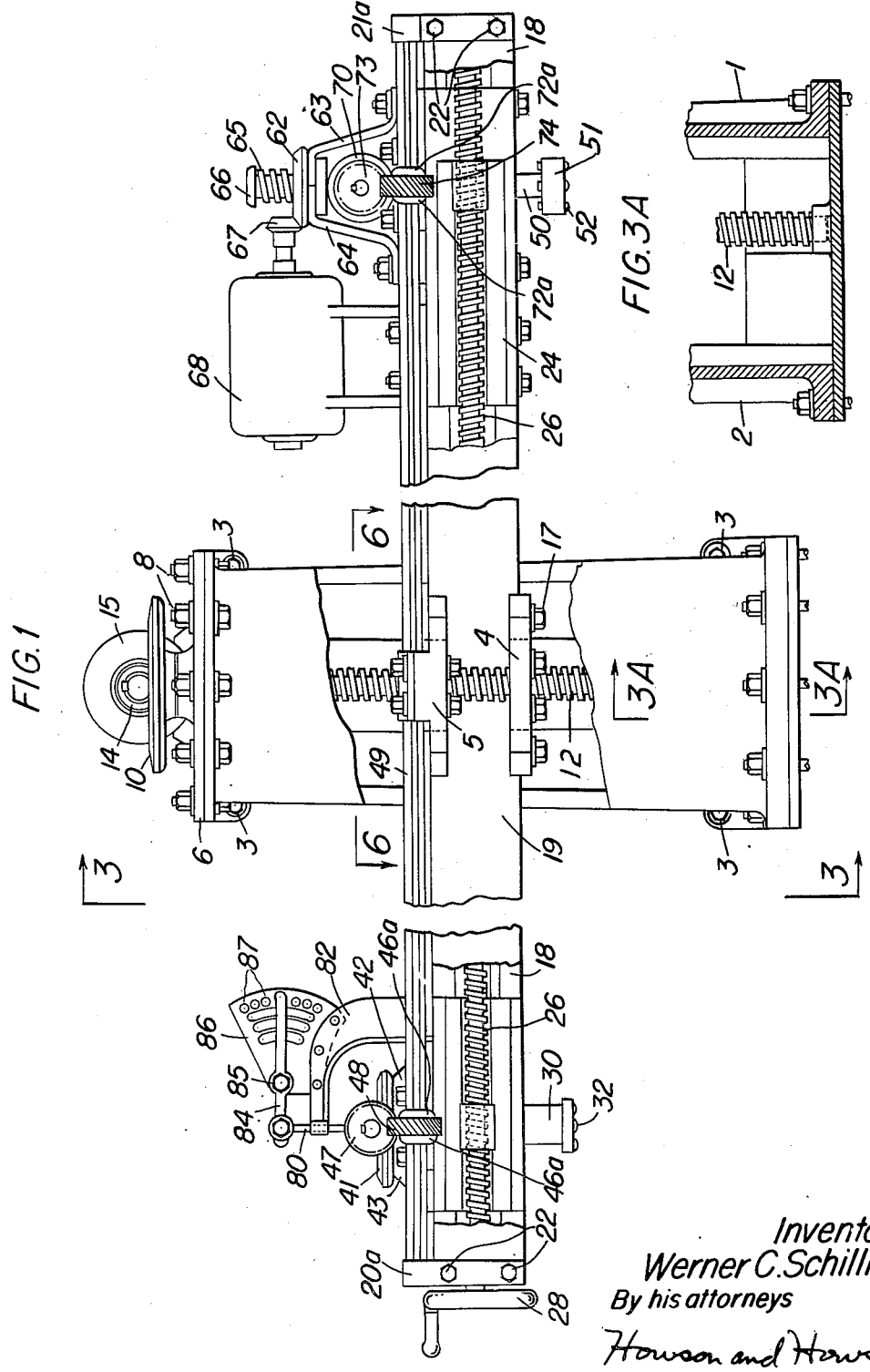

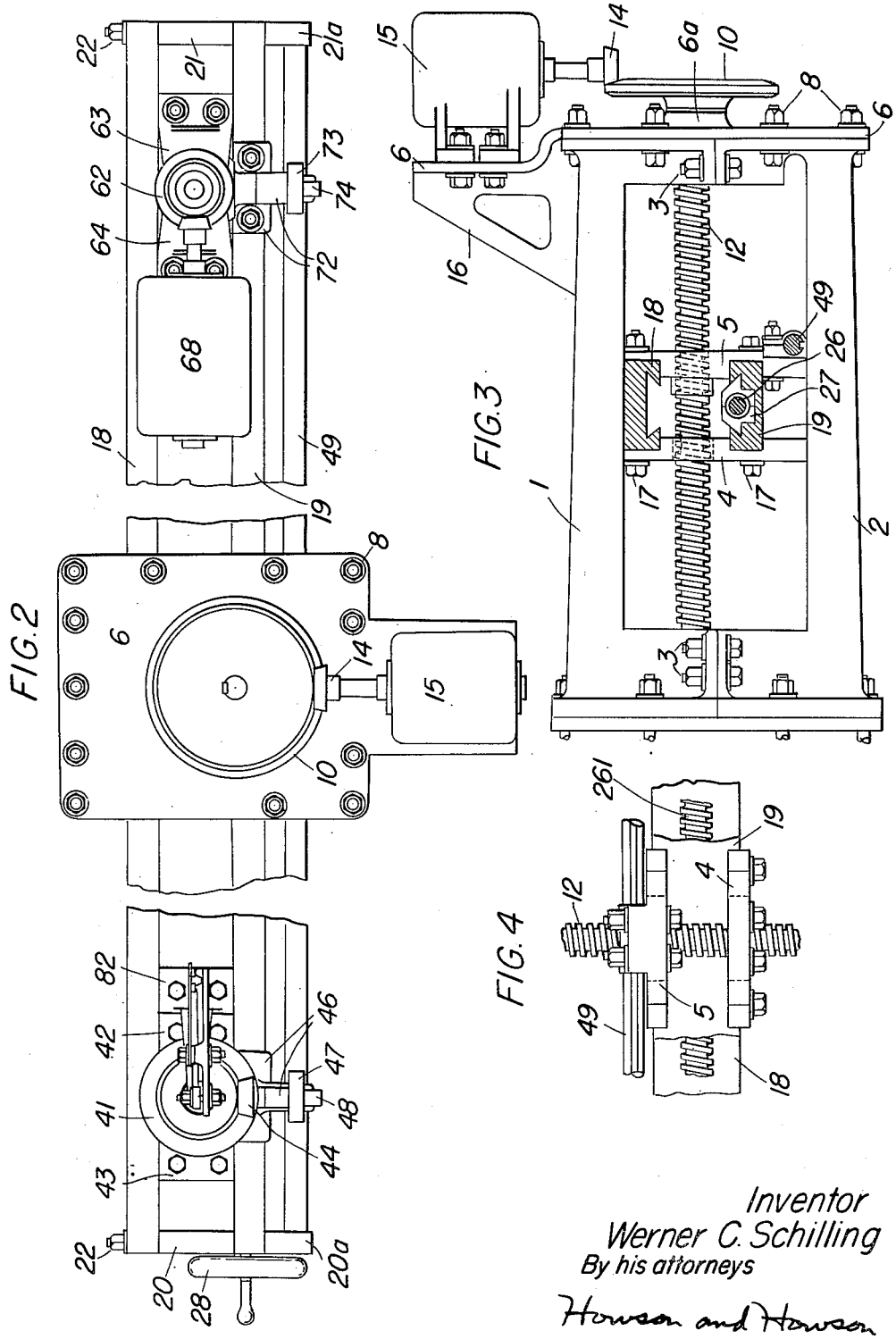

Filed Oct. 12, 1945 4 Sheets-Sheet 3

INVENTOR.
BY Werner C. Schilling
Howson and Howson
his attorneys

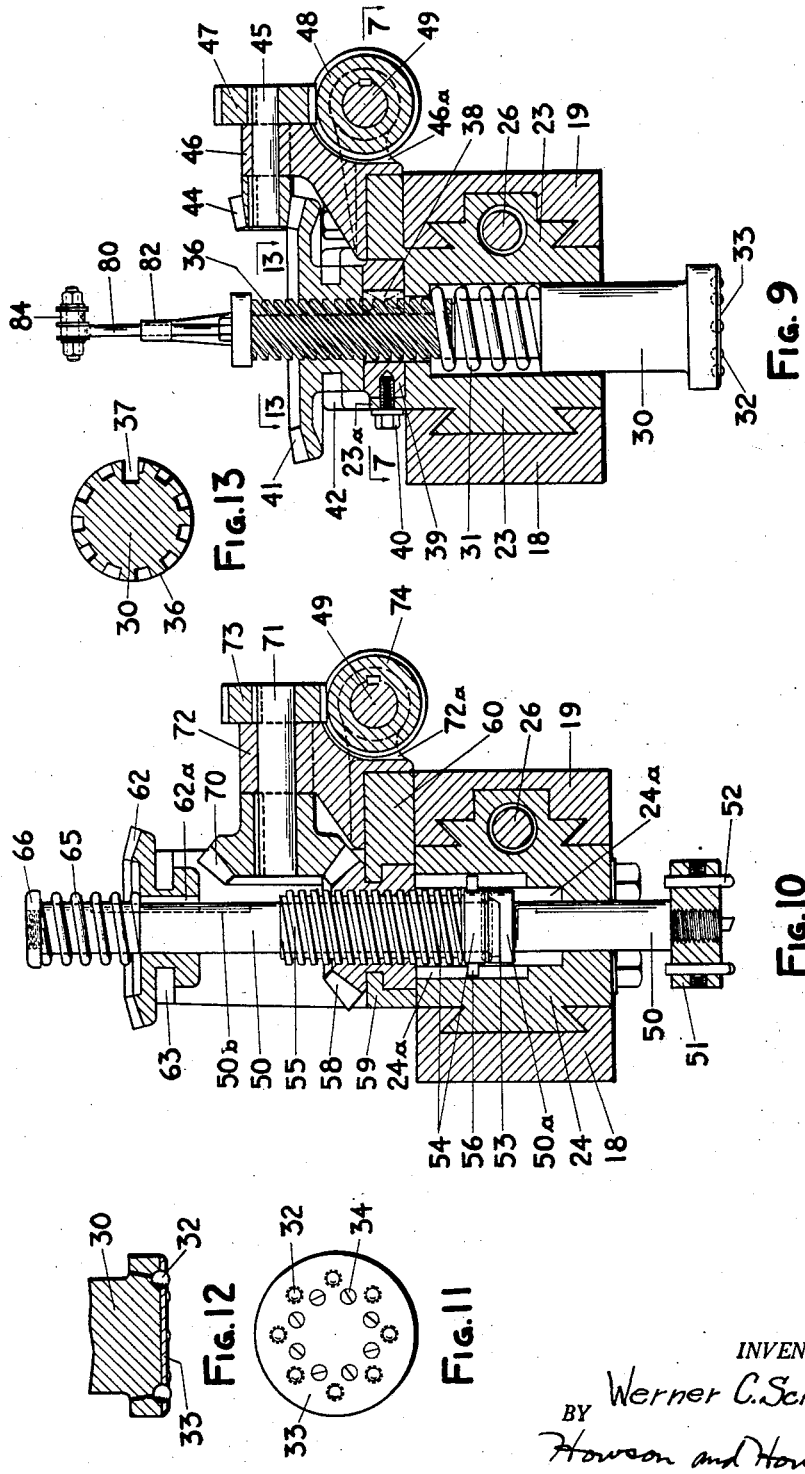

Patented Oct. 16, 1951

2,571,952

UNITED STATES PATENT OFFICE 2,571,952

CONTOUR CUTTER

Werner C. Schilling, Weehawken, N. J.

Application October 12, 1945, Serial No. 622,023

5 Claims. (Cl. 90—13.5)

This invention relates to devices for cutting surfaces to correspond to pattern or previously prepared surfaces and more particularly to devices in which the cutting tool or tools are guided by a tracing or guide device which follows the pattern or previously prepared surface and it is an object of this invention to provide a device of the class described in which the supporting means for the tracing or guide means and the cutting means is adjusted by means under the control of the tracing or guide means so as to bring the movement of the tracing or guide means with respect to its supporting means within a limited predetermined range and thus limit to this range the movement of the cutting means by the guide means. It is also an object of this invention to provide in a device of the class described a guide means which can be readily adjusted relatively to the cutting means so as to provide for the taking of roughing cuts as well as finishing cuts. It is a further object of this invention to provide a guide means having antifriction means for following the pattern surface.

In the drawings—

Fig. 1 is a view in front elevation of a device in accordance with this invention, parts being broken away to show other parts more clearly;

Fig. 2 is a top plan view of the structure shown in Fig. 1;

Figs. 3 and 3A are vertical sectional views taken as on lines 3—3 and 3A—3A, respectively of Fig. 1;

Fig. 4 is a view in elevation of a fragment of the structure of Fig. 1 and illustrating a modified construction;

Fig. 9 is a vertical sectional view at the guide head;

Fig. 10 is a vertical sectional view at the cutter head;

Fig. 11 is a bottom plan view of the guide head;

Fig. 12 is a fragmentary sectional view through the guide head; and

Fig. 13 is a horizontal sectional view taken as on line 13—13 of Fig. 9.

Figure 5:
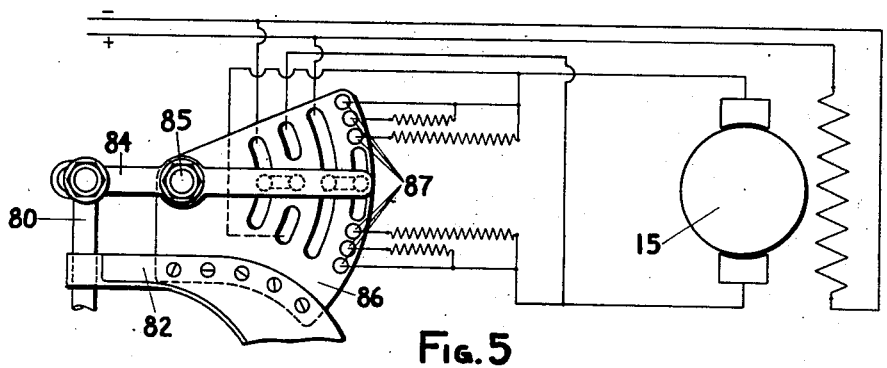
Fig. 5 is a view in elevation of a control switch operated by movement of the guide head and a diagram of the electrical circuits controlled by the switch.
Figure 6:
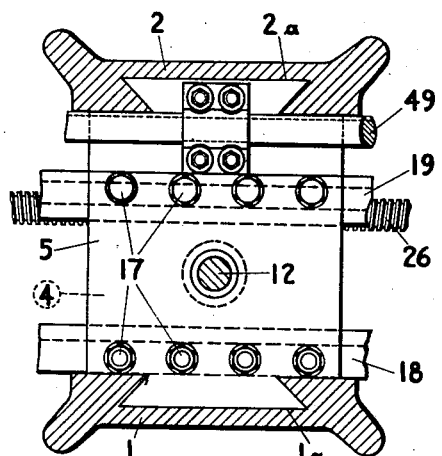
Fig. 6 is a horizontal sectional view taken as on line 6—6 of Fig. 1.
Figure 7:
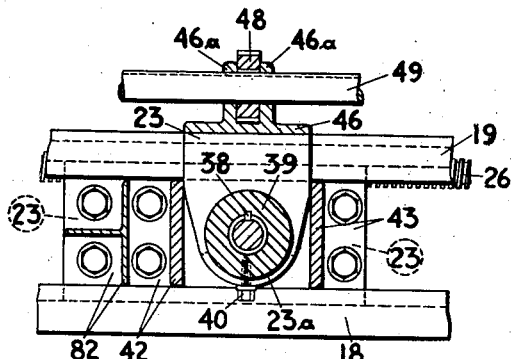
Fig. 7 is a fragmentary top plan view at the tracer head, parts being removed to show other parts more clearly.
Figure 8:
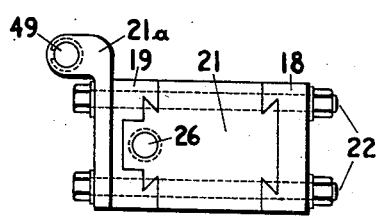
Fig. 8 is an end view of the movable support for the heads as viewed from the right in Fig. 1.

A contour cutter in accordance with this invention comprises as shown in the drawings a suitable standard or supporting frame consisting of two vertically arranged members 1 and 2 secured together by bolts 3 and shaped to provide vertically arranged tracks 1a, 2a respectively for spaced carrier members 4, 5. At their bottoms, the members 1, 2 are joined by a base plate 5a and at their tops they are joined by a plate 6 secured to flanges on the members 1 and 2 by bolts 8. The plate 6 is formed with an upwardly projecting boss 6a which serves as a bearing for the upper end of the threaded shaft 12, the lower end of which is journaled in a boss on the base plate 5a. Fixed on the upper end of the shaft 12, is a gear 10 arranged to be operated in either direction by a bevel gear 14, fixed on the shaft of a motor 15 mounted on an extension of the plate 6, carried by a bracket 16 attached to the standard member 1. The shaft 12 has threaded engagement with the carrier member 5 so that rotation of the shaft 12 will operate the carrier members 4, 5 in the guides 1a, 2a of the members 1 and 2, respectively.

Secured between the carrier members 4, 5 by bolts 17 are spaced horizontally arranged guide and supporting members 18, 19 which project to opposite sides of the standard and have their ends held apart by spacing members 20, 21 respectively, secured in position by bolts 22.

Mounted for sliding movement in the spaced guide members 18 and 19 at opposite sides of the standard are guide blocks 23, 24, respectively. The guide blocks 23 and 24 are formed with threaded openings to receive oppositely threaded portions of a shaft 26 which has its central portion journaled in a bearing block 27 floating in the guide member 19 at the standard and its ends journaled in the spacing members 20 and 21. At one end, a hand wheel 28 is attached to the shaft 26, operation of the hand wheel 28 and shaft 26 providing simultaneous inward movement or simultaneous outward movement of the guide blocks 23 and 24 in the guide members 18 and 19. Where it is desired to provide the guide blocks 23 and 24 with simultaneous movement to the right or to the left, as viewed in Fig. 1, the opposite ends of the shaft 26 may be provided with similarly threaded portions as the shaft 26I in Fig. 4.

Mounted for vertical movement in an opening in the guide block 23 is a tracer comprising a cylindrical guide head 30 biased to its lowermost position by a spring 31 which surrounds a portion of the head 30 of reduced diameter and is confined between a shoulder on the guide head 30 and a shoulder on the guide block 23. At its lower end the head 30 is recessed to receive a plurality of balls 32 arranged on the perimeter of a circle having its center on the axis of the guide head 30. The balls 32 are held in position by a plate 33 secured to the head 30 by screws 34 and provided with openings through which the balls 32 project to provide bearing means readily permitting movement of the head 30 relatively to a surface on which it bears. The upper end of the head 30 is provided with a threaded portion having a square thread 36 of comparatively large pitch and a keyway 37 extending for the full length of the thread 36. The keyway 37 is engaged by a key 38 fitted in an adjustment block 39 which is set in a recess in the upper end of the guide block 23 and held against rotation by an adjustment screw 40 which passes through a slot in the wall 23a of the recess and engages in a threaded opening in the adjustment block 39. Mounted on the adjustment block 39 is a bevel gear 41 having a threaded opening receiving the thread 36 of the guide head 30 and held in position on the block 39 by keepers 42, 43 bolted to the block 23. The keepers 42, 43 prevent vertical movement of the gear 41 with the head 30 and rotation of the head 30 is prevented by the key 38 so that vertical movement of the head 30 causes rotation of the gear 41. Meshing with the gear 41 is a bevel gear 44 fixed on an end of a short shaft 45 which is journaled in a bracket 46 which is bolted to the block 23. On the other end of the shaft 45 is fixed a spiral gear 47 which engages a spiral gear 48 keyed to a shaft 49 but movable longitudinally thereof. The shaft 49 is journaled in spaced ears 46a formed integral with the bracket 46 and the gear 48 is mounted on the shaft 49 between the ears 46a so as to be moved longitudinally of the shaft 49 by movement of the block 23 in the guides 18, 19. The shaft 49 extends the full length of the supporting and guide members 18 and 19 and at its ends is journaled in brackets 20a and 21a respectively, secured to the guide member 19 by the bolts 22.

Mounted for rotation in the guide block 24 at the opposite side of the standard is a spindle 50 having at its lower end a cutting head 51 having cutting tools 52 arranged therein on a circle of equal radius to that on which the balls 32 of the guide head 30 are arranged. Within the block 24, the spindle 50 is provided with a shoulder or collar 50a which forms a seat for a ball bearing 53 against which bears a sleeve 54 having a low-pitched square thread 55 formed thereon. The sleeve 54 is prevented from rotating with the spindle 50 by keys 56 engaged in recesses in the sleeve 54 and slidably engaged in grooves 24a in the block 24. The thread 55 of the sleeve 54 is engaged in a correspondingly threaded opening in a bevel gear 58 rotatably secured in position on the block 24 by keepers 59 and 60 bolted to the block 24. The upper end portion of the spindle 50 above the sleeve 54 is provided with a keyway 50b in which there is slidably mounted a key 62a secured in a bevel gear 62. The bevel gear 62 is held against vertical movement by keepers 63, 64 bolted to the block 24. A spring 65 confined between the gear 62 and a cap 66 secured to the upper end of the spindle 50 causes the spindle 50 to hold the ball bearing 53 against the lower end of the sleeve 54. A pinion 67 meshing with the gear 62 and driven by a motor 68 carried by the block 24 serves to operate the spindle 50 and the cutter head 51.

Meshing with the bevel gear 58 is a bevel gear 70 fixed on an end of a short shaft 71 journaled in a bearing bracket 72 secured to the keeper 60. Fixed on the opposite end of the shaft 71 is a spiral gear 73 which meshes with a spiral gear 74 keyed on the shaft 49 to rotate therewith but movable longitudinally of the shaft. The shaft 49 is journaled in spaced ears 72a formed on the bearing bracket 72 and the gear 74 is mounted on the shaft 49 between the ears 72a. The shaft 49 and the gear coacting with it at either end thereof therefore constitute mechanical means operated by the tracer for moving the cutting head in like direction upon slight vertical movement of the tracer.

Fixed to the upper end of the guide head 30 is a rod 80 guided in a bracket 82 secured to the guide block 23. At its upper end the rod 80 has a pin and slot connection with a contact or switch lever 84 which is pivotally mounted at 85 on a contact base 86 carried by the bracket 82. The contact base 86 is provided with a plurality of contacts 87 connected by circuits of different resistance with the motor 15, the circuits being arranged to cause the motor 15 to operate in opposite directions and at gradually increasing speed as the lever 84 is shifted in one direction or the other from its horizontal or open circuit position in which the motor 15 is not operated. The contacts 87 are so positioned that a limited movement of the switch lever 84 is possible before a circuit is closed and the motor 15 is operated. Thus the contacts are positioned to be closed by movement of the guide head over a predetermined distance. Operation of the motor 15 operates the threaded shaft 12 to raise or lower the guide rails 18, 19, the guide head 30 and the cutter head 51. The circuits controlled by the switch lever 84 are so arranged that the movement of the guides 18, 19 by the motor 15 supplements the movement of the head 30 due to its contact with the pattern surface so as to keep within a limited range the movements of the heads 30 and 51 in the guide blocks 23 and 24, respectively. Thus electrical means is provided, controlled by the tracer, for moving the tracer and the cutting head in like direction upon vertical movement of the tracer over a predetermined distance. The predetermined distance is, of course, the distance necessary to close the contacts 87.

In operation, a left handed pattern or model of the surface to be cut is moved back and forth beneath the guide head 30 and the surface to be cut correspondingly is moved back and forth beneath the cutter head 51. The spring 31 holds the guide head 30 in contact with the pattern surface and vertical movements of the guide head 30, operating through the thread 36, bevel gears 41 and 44, shaft 45 and spiral gears 47 and 48, cause rotation of the shaft 49 in one direction or the other depending upon the direction of movement of the head 30. Rotation of the shaft 49 causes spiral gear 74 to rotate spiral gear 73, shaft 71 and bevel gears 70 and 58 and, through thread 55 on sleeve 54, to raise or lower the cutter head 51 which is being rotated by the motor 68. The low pitch of thread 55 is such that pressure against the cutting tools 52 will not cause the thread 55 to operate the gear 58 and the ratio of gearing in the guide and cutter heads is such that the cutter head 51 moves in the same direction and for the same distance as the guide head 30. During small movements of the guide head 30 the switch lever 84 will not be moved sufficiently to complete a circuit for the motor 15 and all movement of the cutter head 51 will be the result of the operation of the gearing connecting the guide and cutter heads. Larger movements of the cutter head 30 will operate the switch lever 84 to complete a circuit for the operation of the motor 15 to raise or lower the guide rails 18 and 19 in accordance with the direction of movement of the guide head 30 so that the operation of the cutter head 51 by the gearing is held within a small range. Operation of the hand wheel 28 shifts both the guide and cutter heads across the pattern and work pieces so as to cover all parts of the surfaces thereof. Where the work is to be identical with the pattern instead of reversed, the device will be provided with a shaft, as shaft 261 of Fig. 4, having an identical thread on both sides of the standard so that the heads 30 and 51 will be moved in the same direction by rotation of the hand wheel 28 instead of in opposite directions as in Fig. 1.

Where it is desired, as when a roughing cut only is being made by the cutter head, to have the heads relatively displaced vertically, the adjustment screw 40 is loosened and rotated in the slot in the wall 23a, carrying with it the adjustment block 39 and the guide head 30. Rotating the guide head 30 will cause it to be raised or lowered through engagement of the thread 36 with the threaded opening in the gear 41 while the cutter head 51 is not moved. When the desired relative displacement of the heads has been secured, the screw 40 is tightened and the heads retained in their relatively displaced positions.

What is claimed is:

1. In a contour cutter wherein a support carries the tracing and cutting elements and a motor for vertically adjusting the tracing and cutting elements thereon, a tracer comprising a guide block, a guide head movable vertically in said guide block spring-biased downwardly, a spiral thread on said guide head, a train of gears journaled in said guide block operable by said spiral thread upon slight vertical movement of said guide head for moving the cutting element of the contour cutter in like direction, and a bracket fixed to said guide block, in combination with electrical contacts on said bracket for controlling the vertical adjustment motor of the contour cutter, a contact arm pivotally mounted on said bracket and pivotally connected to said guide head, whereby said contacts are closed by the contact arm when the guide has moved over a predetermined distance.

2. For moving the cutting head of a contour cutter vertically with the tracer thereof, a vertically movable spirally threaded guide head constituting a part of the tracer, a vertically immovable bevel gear having an internal thread meshing with the thread of said guide head, said bevel gear being rotatable upon vertical movement of said guide head, a shaft extending between the cutting head and the tracer of the contour cutter, and a train of gears operable by said bevel gear to rotate said shaft, in combination with a non-rotating threaded sleeve for surrounding and bearing in an axial direction upon the cutter head, a second vertically immovable bevel gear having an internal thread meshing with the thread of said sleeve, and a train of gears operated by said shaft to rotate said second bevel gear to raise or lower said sleeve as said guide head is raised or lowered.

3. For moving the cutting head of a contour cutter vertically with the tracer thereof, a vertically movable spirally threaded guide head of high pitch constituting a part of the tracer, a vertically immovable bevel gear having an internal thread meshing with the thread of said guide head, said bevel gear being rotatable upon vertical movement of said guide head, a shaft extending between the cutting head and the tracer of the contour cutter, and a train of gears operable by said bevel gear to rotate said shaft, in combination with a non-rotating threaded sleeve for surrounding and bearing downwardly upon the cutter head, a spring for biasing the cutter head upwardly, a second vertically immovable bevel gear having an internal thread meshing with the thread of said sleeve, and a train of gears operated by said shaft to rotate said second bevel gear to raise or lower said sleeve as said guide head is raised or lowered, the thread of said sleeve being of low pitch to prevent pressure against the cutter head from turning said second bevel gear.

4. In a contour cutter, a frame, a support vertically movable on said frame, a tracer mechanism and a cutting head mounted on said support, said cutting head having a rotary cutter, said tracer and cutting head being vertically adjustable by the adjustment of the support, said tracer mechanism including a tracer guide head having a circle of ball bearings on its lowermost face, a guide block mounted on the support, said guide head being movable vertically in the said guide block, a thread on said guide head and a train of gears journaled in said guide block operable by said thread upon slight vertical movement of said guide head, means operated by said train of gears for moving the rotary cutter in a like direction, electrical contacts on said guide block, means controlled by said electrical contacts for controlling vertical adjustment of the support, and lever means connecting the tracer guide head and electrical contacts, whereby said contacts are closed by movement of said tracer over a predetermined distance.

5. In a contour cutter, a support, a tracer and a cutting head mounted on said support, a vertically movable guide head constituting part of the tracer and spiral threads of high pitch on the guide head, a frame upon which the support is vertically movable and mechanical means operated by said tracer upon slight vertical movement thereof for moving the cutting head and guide head in a like direction; in combination with an adjustment block threaded on the spiral threads adapted to lock the guide head rotatably to the block, a screw in the block adjustably locking the rotary position of the block and elevation of the guide head, whereby the relative positions of the guide head and cutting head can be adjusted for rough and finishing cuts, and electrical means carried by the support and controlled by the tracer adapted to cause vertical movement of the support, tracer and cutting head when the mechanical movement of the tracer caused by the pattern exceeds said slight vertical movement.

WERNER C. SCHILLING.

REFERENCES CITED

The following references are of record in the file of this patent:

UNITED STATES PATENTS

| Number | Name | Date |
|---|---|---|
| 501,091 | Morgencier | July 11, 1893 |
| 689,845 | Barrow | Dec. 31, 1901 |
| 898,168 | Baase | Sept. 8, 1908 |
| 1,073,547 | Tunes | Sept. 16, 1913 |
| 1,450,698 | Morici | Apr. 3, 1923 |
| 2,397,108 | Hanna | Mar. 26, 1946 |
| 2,456,158 | Tancred | Dec. 14, 1948 |